United States Patent
Rarick

(10) Patent No.: US 9,875,083 B2
(45) Date of Patent: Jan. 23, 2018

(54) PERFORMING A COMPARISON COMPUTATION IN A COMPUTER SYSTEM

(71) Applicant: Imagination Technologies, Limited, Kings Langley (GB)

(72) Inventor: Leonard Rarick, San Diego, CA (US)

(73) Assignee: Imagination Technologies Limited, Kings Langley (GB)

( * ) Notice: Subject to any disclaimer, the term of this patent is extended or adjusted under 35 U.S.C. 154(b) by 470 days.

(21) Appl. No.: 14/452,315

(22) Filed: Aug. 5, 2014

(65) Prior Publication Data

US 2016/0041946 A1    Feb. 11, 2016

(51) Int. Cl.
*G06F 7/52* (2006.01)
*G06F 7/552* (2006.01)

(52) U.S. Cl.
CPC ............... *G06F 7/52* (2013.01); *G06F 7/552* (2013.01); *G06F 7/5525* (2013.01); *G06F 2207/5521* (2013.01)

(58) Field of Classification Search
CPC ........ G06F 7/02; G06F 7/5525; G06F 7/4876; G06F 7/523; G06F 7/527–7/5324; G06F 2207/5521
USPC ........................................ 708/503, 620, 625
See application file for complete search history.

(56) References Cited

U.S. PATENT DOCUMENTS

| | | | | | |
|---|---|---|---|---|---|
| 4,754,421 | A | * | 6/1988 | Bosshart | G06F 7/5324 708/620 |
| 5,341,321 | A | * | 8/1994 | Karp | G06F 7/535 708/500 |
| 5,386,375 | A | * | 1/1995 | Smith | G06F 7/5525 708/500 |
| 5,579,253 | A | * | 11/1996 | Lee | G06F 7/523 708/625 |
| 6,523,055 | B1 | * | 2/2003 | Yu | G06F 7/5443 708/603 |
| 7,117,238 | B1 | * | 10/2006 | Foskett | G06F 7/535 708/502 |
| 2003/0065699 | A1 | * | 4/2003 | Burns | G06F 7/5324 708/625 |
| 2004/0167954 | A1 | * | 8/2004 | Griessing | G06F 7/5443 708/552 |

(Continued)

*Primary Examiner* — Matthew Sandifer
(74) *Attorney, Agent, or Firm* — Vorys, Sater, Seymour and Pease LLP; Vincent M DeLuca

(57) ABSTRACT

A method and computer system are provided for performing a comparison computation, e.g. for use in a check procedure for a reciprocal square root operation. The comparison computation compares a multiplication of three values with a predetermined value. The computer system performs the multiplication using multiplier logic which is configured to perform multiply operations in which two values are multiplied together. A first and second of the three values are multiplied to determine a first intermediate result, $w_1$. The digits of $w_1$ are separated into two portions, $w_{1,1}$ and $w_{1,2}$. The third of the three values is multiplied with $w_{1,2}$ and the result is added into a multiplication of the third of the three values with $w_{1,1}$ to thereby determine the result of multiplying the three values together. In this way the comparison is performed with high accuracy, while keeping the area and power consumption of the multiplier logic low.

18 Claims, 3 Drawing Sheets

(56) References Cited

U.S. PATENT DOCUMENTS

2006/0161613 A1\* 7/2006 Yoo .......................... G06F 7/50
708/650
2015/0058389 A1\* 2/2015 Blomgren ............... G06F 7/525
708/209

\* cited by examiner

PERFORMING A COMPARISON COMPUTATION IN A COMPUTER SYSTEM

BACKGROUND

There are many situations in which a computer system needs to perform a reciprocal square root operation. To give just some examples, numerical analysis, complex number computations, statistical analysis, computer graphics, and signal processing are among the fields where reciprocal square root operations are often performed by computer systems. As an example, a computer system may perform a reciprocal square root operation using a converging approximation technique which may use a quadratic convergence algorithm such as a Newton-Raphson technique or a Goldschmidt technique. In particular, the converging approximation technique may converge towards a result (e.g. a floating point result) from below, such that a proposed result provided by the converging approximation is never too large, i.e. it is either correct or it is too small. The proposed result provided by the converging approximation technique can be rounded, in accordance with a rounding mode, to provide a rounded proposed result. The rounding mode may, for example, be a round away from zero, a round towards zero or a round to nearest mode.

For example, the rounded result may have k bits, and the rounding mode may be a round towards zero mode. One way of obtaining a result that is always correct would be to obtain an infinitely precise result and then that infinitely precise result could be truncated to k bits of precision. However, in real computer systems, an infinitely precise result is often not obtainable, and so an approximation of the result is computed to at least k+1 bits and then that approximation can be truncated to obtain the result with k bits. In this way, the correctly rounded result is either the obtained k-bit result, or the obtained k-bit result plus one in the least significant bit.

A converging approximation technique (such as the Newton Raphson technique) receives an input value b and can approximate a value for $$\frac{1}{\sqrt{b}},$$

(denoted r). The result, r, is a rounded k-bit result. A check procedure could be carried out to determine whether the correctly rounded result is the obtained k-bit result, or the obtained k-bit result plus one in the least significant bit (denoted r+u, where u is an increment in the least significant bit position of r).

In a round towards zero mode, the converging approximation technique determines a result for $$\frac{1}{\sqrt{b}}$$

which has more than k bits of accuracy and then truncates that result to determine r. Due to the nature of the converging approximation technique, in the round towards zero mode it is known that $$r \leq \frac{1}{\sqrt{b}}.$$

In the round towards zero mode, if $$r + u > \frac{1}{\sqrt{b}}$$

then r is the correctly rounded result, whereas if $$r + u \leq \frac{1}{\sqrt{b}}$$

then r+u is the correctly rounded result. Therefore, in the check procedure, an error value e is considered whereby $$\frac{1}{b} = (r + u - e)^2,$$

wherein due to the nature of the converging approximation technique, e could be positive or negative and $|e| \leq u$. If e is positive then r is the correctly rounded result, whereas if e is negative (or zero) then r+u is the correctly rounded result. In the round towards zero mode, a check parameter, g, is defined as:

$$g=(r+u)^2 b-1. \quad (1)$$

It can be shown that g=e(2r+2u−e)b, such that g has the same sign as e (since b is positive and so is (2r+2u−e)). A computation of g in accordance with equation 1 would involve a multiplication of three values: (r+u), (r+u) and b. As described below, a multiplication of three values is not trivial to compute accurately in typical hardware.

In a round away from zero mode, the converging approximation technique determines a result for $$\frac{1}{\sqrt{b}}$$

which has more than k bits of accuracy and then truncates that result and adds one unit of least precision (ulp) to determine r. In the round away from zero mode, if $$r > \frac{1}{\sqrt{b}}$$

then r is the correctly rounded result, whereas if $$r \leq \frac{1}{\sqrt{b}}$$

then r+u is me correctly rounded result. Therefore, in the check procedure, an error value e is considered whereby $$\frac{1}{b} = (r - e)^2,$$

wherein due to the nature of the converging approximation technique, e could be positive or negative and $|e| \leq u$. If e is positive then r is the correctly rounded result, whereas if e is negative (or zero) then r+u is the correctly rounded result. In the round away from zero mode, a check parameter, g, is defined as:

$$g = r^2 b - 1. \quad (2)$$

It can be shown that g=e(2r−e)b, such that g has the same sign as e (since b is positive and so is (2r−e)). A computation of g in accordance with equation 2 would involve a multiplication of three values: r, r and b. As described below, a multiplication of three values is not trivial to compute accurately in typical hardware.

In a round to nearest mode, the converging approximation technique determines a result for $$\frac{1}{\sqrt{b}}$$

which has more than k bits of accuracy and then adds one half unit of least precision $$\left(\frac{u}{2}\right)$$

and then truncates that result to determine r. In the round to nearest mode, if $$r + \frac{u}{2} > \frac{1}{\sqrt{b}}$$

then r is the correctly rounded result, whereas if $$r + \frac{u}{2} < \frac{1}{\sqrt{b}}$$

when r+u is me correctly rounded result. Therefore, in the check procedure, an error value e is considered whereby $$\frac{1}{b} = \left(r + \frac{u}{2} - e\right)^2,$$

wherein due to the nature of the converging approximation technique, e could be positive or negative and |e|≤u. If e is positive then r is the correctly rounded result, whereas if e is negative then r+u is the correctly rounded result. In the round to nearest mode, a check parameter, g, is defined as:

$$g = \left(r + \frac{u}{2}\right)^2 b - 1. \quad (3)$$

It can be shown that g=e(2r+u−e)b, such that g has the same sign as e (since b is positive and so is (2r+u−e)). A computation of g in accordance with equation 3 would involve a multiplication of three values:

$$\left(r + \frac{u}{2}\right), \left(r + \frac{u}{2}\right)$$

and b. As described below, a multiplication of three values is not trivial to compute accurately in typical hardware.

A standard hardware multiply unit is configured to receive inputs containing up to a number of bits (i.e. up to k bits) and to provide an output having ≤2k bits. To then multiply the 2k-bit output with another input containing ≤k bits would require a multiply unit which could receive such inputs and provide a result having ≤3k bits. However, such an increase in the size of the multiply unit in typical hardware environments is usually not justifiable due to the increase in area and heat generation. Another approach could be to truncate the first 2k-bit output such that it has only k bits and then perform the second multiplication on the truncated value. However, some accuracy will be lost by the truncation. It is noted that in the reciprocal square root check procedure the result of the multiplication of the three values will be very close to 1, and it is compared with 1 in order to determine the sign of g, such that the inaccuracies introduced by the truncation of the first multiplication will render the check procedure too unreliable to be of use, hence reducing the number of bits in the first multiply is not an option since the result would not be exact. Therefore, typically, no check procedure is carried out on the result of the converging approximation technique used to determine a reciprocal square root. The reciprocal square root operation is typically referred to as a "reciprocal square root approximation" because no check procedure is performed so the result may be inaccurate by one unit of least precision, i.e. by u.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

There is provided a method of performing a comparison computation in a computer system for comparing a result of a multiplication computation with a predetermined value, wherein the multiplication computation is implemented by multiplier logic of the computer system and includes a multiplication of three values, wherein the multiplier logic is configured for performing multiply operations in which two values are multiplied together, the method comprising: performing a first multiply operation with the multiplier logic of the computer system to determine a first intermediate result by multiplying a first and a second of the three values; separating digits of the first intermediate result to form: (i) a first portion comprising the most significant digits of the first intermediate result, and (ii) a second portion comprising less significant digits of the first intermediate result; performing a second multiply operation with the multiplier logic to determine a second intermediate result by multiplying a third of the three values with said second portion of the first intermediate result; performing a third multiply operation with the multiplier logic to determine a third result, the third multiply operation including multiplying the third of the three values with said first portion of the first intermediate result and adding at least one of the digits of the second intermediate result; and using the third result to determine a comparison of the result of the multiplication computation with the predetermined value. The comparison computation may for example be performed for use in a check procedure implemented by the computer system for checking the result of a reciprocal square root calculation.

There is also provided a computer system configured to perform a comparison computation for comparing a result of a multiplication computation with a predetermined value, wherein the multiplication computation includes a multiplication of three values, the computer system comprising: multiplier logic configured to perform multiply operations in which two values are multiplied together; and a controller configured to control the multiplier logic so as to cause the multiplier logic to implement multiply operations for the multiplication computation by: performing a first multiply operation with the multiplier logic to determine a first intermediate result by multiplying a first and a second of the three values, wherein the digits of the first intermediate result are separable to form: (i) a first portion comprising the most significant digits of the first intermediate result, and (ii) a second portion comprising less significant digits of the first intermediate result; performing a second multiply operation with the multiplier logic to determine a second intermediate result by multiplying a third of the three values with said second portion of the first intermediate result; and performing a third multiply operation with the multiplier logic to determine a third result, the third multiply operation including multiplying the third of the three values with said first portion of the first intermediate result and adding at least one of the digits of the second intermediate result; and wherein the computer system further comprises compare logic configured to use the third result to determine a comparison of the result of the multiplication computation with the predetermined value. The multiplier logic, the controller and the compare logic may be part of a check module which is configured to perform a check procedure, wherein the comparison computation may be for use in the check procedure implemented by the check module for checking the result of a reciprocal square root calculation.

There may be provided a computer system configured to perform a multiplication computation which includes determining a result of a multiplication of three values, the computer system comprising: multiplier logic configured to perform multiply operations in which two values are multiplied together; and a controller configured to control the multiplier logic so as to cause the multiplier logic to implement the multiplication computation by: performing a first multiply operation with the multiplier logic to determine a first intermediate result by multiplying a first and a second of the three values, wherein the digits of the first intermediate result are separable to form: (i) a first portion comprising the most significant digits of the first intermediate result, and (ii) a second portion comprising less significant digits of the first intermediate result; performing a second multiply operation with the multiplier logic to determine a second intermediate result by multiplying a third of the three values with said second portion of the first intermediate result; and performing a third multiply operation with the multiplier logic to determine a third result by multiplying the third of the three values with said first portion of the first intermediate result and adding at least one of the digits of the second intermediate result, wherein the third result is indicative of the result of the multiplication computation.

There may be provided a method of performing a multiplication computation in a computer system, wherein the multiplication computation is implemented by multiplier logic of the computer system and includes determining a result of a multiplication of three values, wherein the multiplier logic is configured for performing multiply operations in which two values are multiplied together, the method comprising: performing a first multiply operation with the multiplier logic of the computer system to determine a first intermediate result by multiplying a first and a second of the three values; separating digits of the first intermediate result to form: (i) a first portion comprising the most significant digits of the first intermediate result, and (ii) a second portion comprising less significant digits of the first intermediate result; performing a second multiply operation with the multiplier logic to determine a second intermediate result by multiplying a third of the three values with said second portion of the first intermediate result; and performing a third multiply operation with the multiplier logic to determine a third result by multiplying the third of the three values with said first portion of the first intermediate result and adding at least one of the digits of the second intermediate result, wherein the third result is indicative of the result of the multiplication computation.

There may also be provided a computer readable storage medium having encoded thereon: (i) computer readable code for generating a computer system as described in any of the examples herein, or (ii) computer readable code adapted to perform the steps of any of the methods described herein when the code is run on a computer.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
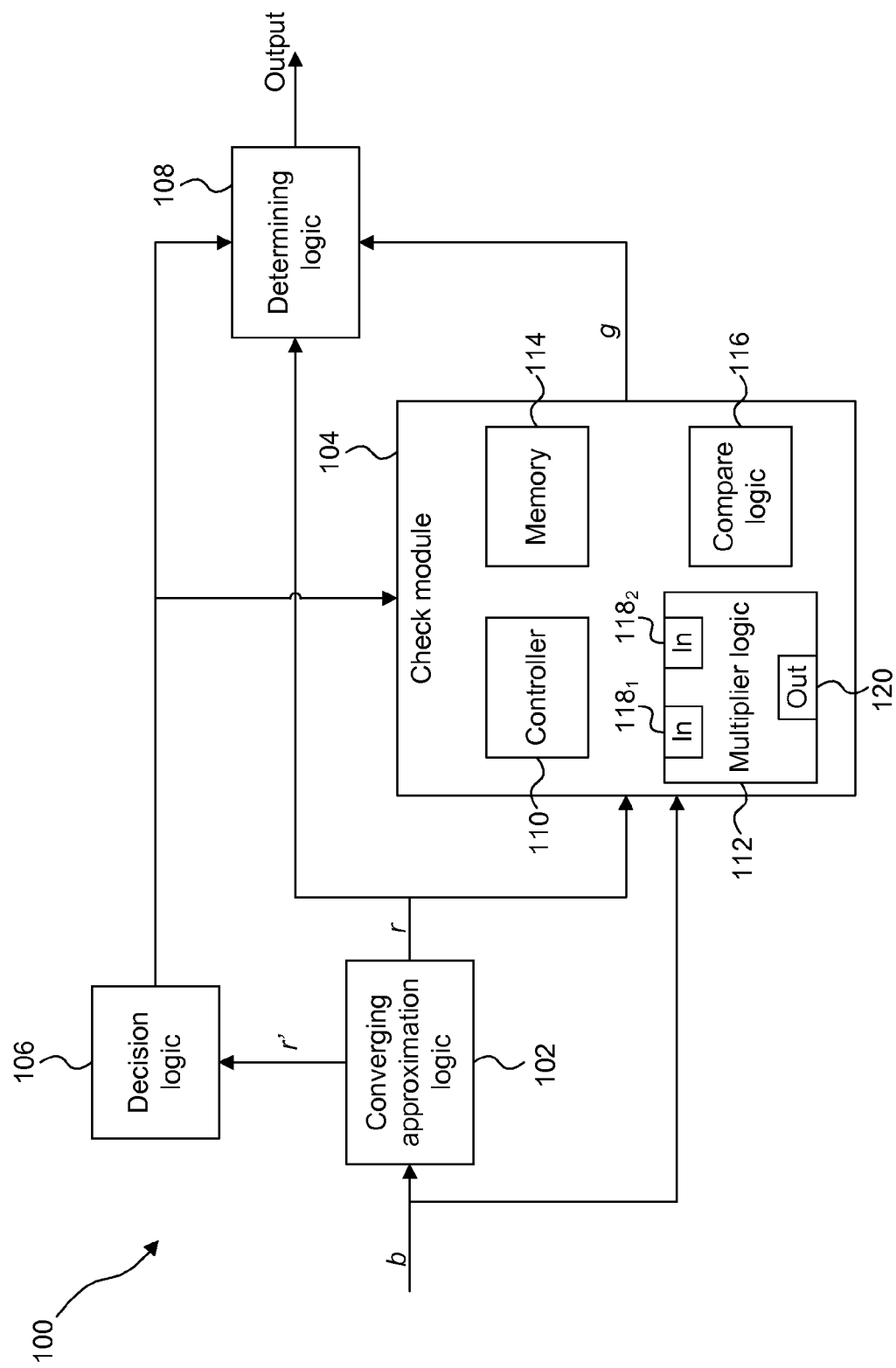
FIG. 1 is a schematic diagram of a computer system for implementing a reciprocal square root operation.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The examples described herein provide a method for performing a comparison computation to compare a result of a multiplication computation with a predetermined value, wherein the multiplication computation comprises multiplying three values together. The examples described herein are suited to the situation in which the comparison needs to be performed to a high level of accuracy and in which multiplier logic of a computer system is configured to perform multiply operations which multiply two values together, but in which the multiplier logic is limited in area and power consumption such that the result of multiplying two values together may have too many bits to use as an input for multiplying with another value. An example of such a situation is when the comparison computation is performed for use in a check procedure implemented by the computer system for checking the result of a reciprocal square root calculation. In examples described herein, multiplier logic multiplies a first and a second of the three values which are to be multiplied together, to thereby determine a first intermediate result. The digits of the first intermediate result can be separated to form a first portion comprising the most significant digits and a second portion comprising less significant digits. The multiplier logic can then multiply the third of the three values with the second portion of the first intermediate result to determine a second intermediate result. The multiplier logic can then multiply the third of the three values with the first portion of the first intermediate result and add one or more digits of the second intermediate result, to thereby determine a third result which can be used to determine the result of the multiplication computation. For example, the third result may be used to represent the result of the multiplication computation, or the third result may be concatenated with some of the bits of the second intermediate result which were not added in the third multiply operation to thereby determine the result of the multiplication computation. By adding the one or more digits of the second intermediate result in the third multiply operation, the accuracy of the determined result is sufficient for comparing with the predetermined value, e.g. the determined result may be exact.

Furthermore, this accuracy is achieved without increasing the size of the multiplier logic. These advantages are achieved at the cost of having to perform three multiply operations (rather than two) in order to multiply the three values together. Performing an extra multiply operation may add some latency into the multiplication computation, but in many situations, this drawback may be significantly outweighed by the advantages that are achieved. The check procedure of a reciprocal square root calculation is an example of a situation in which the advantages outweigh the drawback. That is, the examples described herein enable a check procedure to be performed on the result of a reciprocal square root operation in a manner which is not prohibitively costly to implement in terms of area and power consumption of the multiplier logic, and in a manner which may provide an exact result for the check procedure.

FIG. 1 shows an example of a computer system 100 for implementing a reciprocal square root operation. The computer system 100 may be implemented in hardware. Implementing the system 100 in hardware may allow for faster computation. The computer system 100 comprises converging approximation logic 102, a check module 104, decision logic 106 and determining logic 108. The check module 104 comprises a controller 110, multiplier logic 112, a memory 114 and compare logic 116. The multiplier logic 112 comprises two inputs $118_1$ and $118_2$ and an output 120. The multiplier logic 112 is configured to receive two input values, each having ≤k bits, at the respective inputs $118_1$ and $118_2$, and to perform a multiply operation on the two input values to determine a result having 2k bits which is provided from the output 120. The multiplier logic 112 may for example be implemented as one or more binary multipliers in hardware. The controller 110 (which may be implemented in software or hardware) controls which values are provided to the inputs 118 of the multiplier logic 112 and controls what happens to the value provided from the output 120 of the multiplier logic 112. The memory 114 is configured to store values which may subsequently be provided to the inputs 118 of the multiplier logic 112 or may be provided to the compare logic 116 under the control of the controller 110. As described in more detail below, the compare logic 116 is configured to compare a result of a multiplication computation with a predetermined value. In some examples, the logic and module shown in FIG. 1 are implemented in hardware, e.g. as fixed function circuitry in a computer processor. Each logic block and module shown in FIG. 1 may be implemented as one or more units within the computer system 100.

An output from the converging approximation logic 102 providing a rounded result r is coupled to an input of the check module 104 and to an input of the determining logic 108. Another output from the converging approximation logic 102 providing an unrounded result r' is coupled to an input of the decision logic 106. An output of the decision logic 106 is coupled to an input of the check module 104 and to an input of the determining logic 108. An output of the check module 104 is coupled to an input of the determining logic 108.

Figure 2:
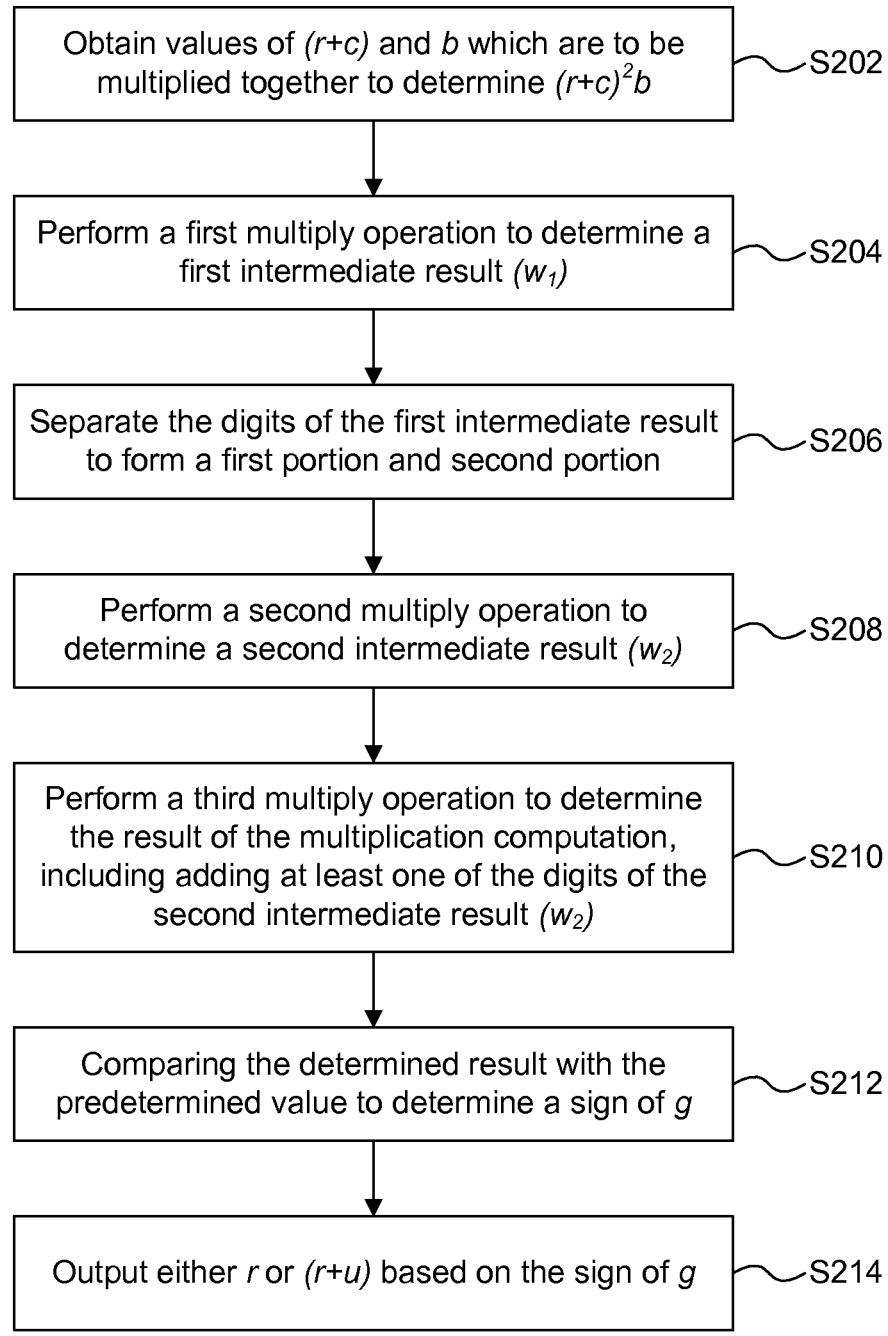
FIG. 2 is a flow chart for a method of implementing a check procedure for checking the result of a reciprocal square root operation in a computer system.

The operation of the computer system 100 is described with reference to FIG. 2 which shows a method of implementing a check procedure for checking the result of a reciprocal square root operation in the computer system 100. The system 100 is arranged to receive an input value b. In particular, the converging approximation logic 102 is arranged to receive the input value b. The system 100 operates to determine a reciprocal square root of the input value, i.e. to determine a value of $$\frac{1}{\sqrt{b}},$$

which is outputted form the determining logic 108. The converging approximation logic 102 implements a converging approximation technique. The converging approximation technique may use a quadratic convergence algorithm, e.g. to implement a Newton-Raphson technique, to thereby converge towards a result from below, such that a proposed result provided by the converging approximation is never too large, i.e. it is either correct or it is too small. The converging approximation logic 102 determines an unrounded approximation of the result, r', which has more bits than are needed in the rounded result, r. The rounded result can then be determined from the unrounded result in accordance with the particular rounding mode currently being used. The rounding mode may, for example, be a round away from zero, a round towards zero or a round to nearest mode. For example, the unrounded result, r', may include four more bits than the rounded result, r. The rounded result, r, is either correct or it is smaller than correct result by one unit of least precision (ulp). Since the unrounded result comprises more bits (e.g. four more bits) than the rounded result, an inaccuracy in the unrounded result, r', often will not cause an inaccuracy in the rounded result, r. The decision logic 106 determines whether an inaccuracy in the unrounded result, r', might cause an inaccuracy in the rounded result, r, and if this is the case then the check module 104 is used to perform a check procedure on the rounded result; otherwise the rounded result does not need to be checked by the check module 104.

As an example, in the round towards zero rounding mode or the round away from zero rounding mode, if the unrounded result r' includes four extra bits compared to the rounded result r, then if the four extra bits are all ones then an inaccuracy in the ulp of the unrounded result could cause an inaccuracy in the ulp of the rounded result, in which case a check procedure for the rounded result is to be performed. However, if the four extra bits are not all ones then an inaccuracy in the ulp of the unrounded result will not cause an inaccuracy in the ulp of the rounded result, in which case a check procedure for the rounded result is not to be performed. Similarly, in the round to nearest rounding mode, if the four extra bits are 0111 then an inaccuracy in the ulp of the unrounded result r' could cause an inaccuracy in the ulp of the rounded result r, in which case a check procedure for the rounded result is to be performed. However, if the four extra bits are not 0111 in the round to nearest mode then an inaccuracy in the ulp of the unrounded result will not cause an inaccuracy in the ulp of the rounded result, in which case a check procedure for the rounded result is not to be performed. Therefore, an average of one in sixteen of the rounded results determined by the converging approximation logic 102 will be checked by the check module 104 when the unrounded result r' includes four extra bits compared to the rounded result r. In general, when the unrounded result r' includes x extra bits compared to the rounded result r, an average of one in $2^x$ of the rounded results determined by the converging approximation logic 102 will be checked by the check module 104. The decision logic 106 outputs a signal to the check module 104 and to the determining logic 108 to indicate whether a check procedure is to be performed. If no check procedure is to be performed then the check module 104 does not implement a check procedure and the determining logic 108 forwards the rounded result r received from the converging approximation logic 102 as the output of the system 100 to represent the value of $$\frac{1}{\sqrt{b}}.$$

However, if a check procedure is to be performed then the check module 104 implements a check procedure as described below and the determining logic 108 uses a check parameter g provided by the check module 104 to determine whether to output the rounded result r or a value of (r+u) to represent the value of $$\frac{1}{\sqrt{b}}.$$

In step S202 the rounded result of the converging approximation technique, r, is provided to the check module 104, and the input value b is also provided to the check module 104. The check procedure for checking the result r, involves multiplying three values together: (r+c), (r+c) and b, where c is either 0, $$\frac{u}{2}$$

or u depending on the rounding mode and where u is a unit of least precision (ulp) of the result r. The controller 110 can obtain the correct value of (r+c) given the result r in accordance with the rounding mode. For example, in a round towards zero mode, c=u; in a round away from zero mode, c=0; and in a round to nearest mode, $$c = \frac{u}{2}.$$

The check parameter, g, is determined in accordance with the equation:

$$g=(r+c)^2 b-1. \qquad (4)$$

The multiplier logic 112 is configured to perform multiply operations for determining the product of two values, but what is desired is the result of a multiplication of three values.

To illustrate the problem of obtaining the product of three values, an example is given in which the multiplier logic 112 is designed to obtain the product of two three digit numbers on each multiply operation. In this example, decimal values are used to aid the understanding of the example because it is easier to follow, but the same problem exists for any base such as with binary values. Consider multiplying 496*945*945. We may first compute 945*496 as:

```
    945
    496
   ----
   5670
   8505
   3780
  ------
  468720
```

The result is a six digit number. Then this intermediate result (468720) is to be multiplied by 945 as:

```
    468720
       945
   -------
   2343600
   1874880
   4218480
  --------
 442940400
```

The result is a nine digit number. The multiplier logic 112 is not designed to take input values having six digits or to provide a result having nine digits, so the multiplier logic 112 cannot handle this second multiplication. In a fast arithmetic computational unit, the area of the hardware used to find the product of two numbers dominates other functions, so it is not reasonable to double that size (e.g. to allow for 6-digit input values), particularly for an operation that is not used frequently such as the check procedure for a reciprocal square root operation. Furthermore, finding a crude approximation for the multiplication of the three values (e.g. by truncating the intermediate result such that the second multiply operation finds the result of 468*945=442260) is not sufficient for the check procedure performed in the check module 104 because the check module 104 should determine with some certainty whether the check parameter, g, is positive, negative, or zero. It is noted that in the check procedure which determines the check parameter according to equation 4, the result of $(r+c)^2 b$ is likely to be very close to 1, so in order to determine the sign of g, it helps if the result of the multiplication computation to determine the value of $(r+c)^2 b$ is found exactly.

The controller 110 controls the operation of the check module 104 such that the multiplier logic 112 performs the appropriate multiply operations in order to determine the value of $(r+c)^2 b$. In particular, in step S204 the multiplier logic 112 performs a first multiply operation to determine a first intermediate result ($w_1$) by multiplying a first and a second of the three values which are to be multiplied together. For example, the multiplier logic 112 might multiply (r+c) with b to determine the first intermediate result $w_1$. As described above, both (r+c) and b have ≤k bits such that the first intermediate result $w_1$ will have ≤2k bits.

In step S206 the digits of the first intermediate result $w_1$ are separated to form: (i) a first portion comprising the most significant digits of the first intermediate result $w_1$, and (ii) a second portion comprising less significant digits of the first intermediate result $w_1$. The first portion may be referred to herein as $w_{1,1}$ and the second portion may be referred to herein as $w_{1,2}$. The concatenation of $w_{1,1}$ and $w_{1,2}$ may be represented as $\{w_{1,1}, w_{1,2}\}$, and the first intermediate result $w_1$ can be considered to be a concatenation of the first and second portions, i.e. $w_1=\{w_{1,1}, w_{1,2}\}$. In some examples the digits of the first intermediate result $w_1$ may be halved, such that the first portion $w_{1,1}$ comprises the most significant half of the digits of the first intermediate result $w_1$, and the second portion $w_{1,2}$ comprises the least significant half of the digits of the first intermediate result $w_1$. In other examples, the first portion $w_{1,1}$ may comprise the k most significant digits of the first intermediate result $w_1$, and the second portion $w_{1,2}$ may comprise the remaining digits of the first intermediate result $w_1$. In the examples described above, all of the digits of the first intermediate result $w_1$ are present in either the first portion or the second portion.

It is noted that the first intermediate result $w_1$ computed in step S204 could be stored in the memory 114, and then the first intermediate result $w_1$ may be read from the memory 114 and step S206 could be performed at that point in order to separate the digits of the first intermediate result $w_1$ to form the first and second portions, $w_{1,1}$ and $w_{1,2}$. Alternatively, instead of reading out the first intermediate result $w_1$ from the memory 114 and then separating its digits, it could be that only some of the digits (not all of the digits) of the first intermediate result $w_1$ are read out of the memory 114, thereby separating the digits of the first intermediate result $w_1$ appropriately. As another alternative, the first intermediate result $w_1$ computed in step S204 could be separated into the first and second portions, and then the first portion $w_{1,1}$ could be stored in the memory 114 and the second portion $w_{1,2}$ could be provided to an input 118 of the multiplier logic 112 without storing it in the memory 114.

In step S208 the multiplier logic 112 performs a second multiply operation to determine a second intermediate result ($w_2$) by multiplying the second portion ($w_{1,2}$) of the first intermediate result $w_1$ with a third of the three values which are to be multiplied together. For example, the multiplier logic 112 may multiply the second portion $w_{1,2}$ with (r+c) to determine the second intermediate result $w_2$. As described above, (r+c) has ≤k bits, and the second portion $w_{1,2}$ also has ≤k bits, such that the second intermediate result $w_2$ will have ≤2k bits.

In step S210 the multiplier logic 112 performs a third multiply operation to determine a third result, $w_3$, (which may be used to represent the result of the multiplication computation, i.e. the value of $(r+c)^2 b$) by multiplying the first portion ($w_{1,1}$) of the first intermediate result $w_1$ with the third of the three values which are to be multiplied together, and adding at least one of the digits of the second intermediate result $w_2$. For example, at least some, or all, of the digits of the second intermediate result $w_2$ are added in the third multiply operation. For example, the k most significant digits of the second intermediate result $w_2$ may be added in the third multiply operation. For example, the second intermediate result $w_2$ may be considered to be a concatenation of a first portion of digits ($w_{2,1}$) which are to be added in the third multiply operation and a second portion of digits ($w_{2,2}$) which are the remaining digits and which are not to be added in the third multiply operation, i.e. $w_2=\{w_{2,1}, w_{2,2}\}$. It is noted that it is simple for the multiplier logic 112 to add an additional term in a multiply operation (e.g. when the multiplier logic 112 is implemented in hardware as a binary multiplier). For example, the multiplier logic 112 may multiply the first portion $w_{1,1}$ with (r+c) and add the k most significant digits ($w_{2,1}$) of the second intermediate result $w_2$, to thereby determine the third result, $w_3$ which may be for use in determining the result of the multiplication computation. That is, the third result, $w_3$, is for use in representing at least some of the digits of the result of the multiplication computation. The determined result, $w_3$, is therefore be given by the equation $w_3=w_{1,1}(r+c)+w_{2,1}$. It is noted that the exact result of multiplying the three values together can be given as a concatenation: $\{w_3, w_{2,2}\}$. Therefore in some examples, a concatenation of $w_3$ and $w_{2,2}$ may be performed to determine the result of the multiplication computation, whereas in some other examples, $w_3$ may be sufficiently accurate for use in representing the result of the multiplication computation. That is, the extra bits of precision provided by $w_{2,2}$ might not be needed, and $w_3$ can be used to give the determined result of the multiplication of the three values.

It can be appreciated that steps S204 to S210 provide a way of accurately determining the result of a multiplication of three values using the multiplier logic 112 which is configured to perform multiply operations in which two values are multiplied together. This is achieved without increasing the size of the multiplier logic 112 because each multiply operation is performed on inputs which have ≤k bits. Each multiply operation will take some number of clock cycles to complete (e.g. 3, 4 or 5 clock cycles), and the method involves performing three multiply operations. So the latency of the multiplication computation may be slightly increased compared to a computation including only two multiply operations, but in some situations (e.g. for performing a check procedure to check the rounded result of a reciprocal square root calculation), the drawback of this extra latency is outweighed by the benefit of the improved accuracy of the multiplication computation without needing to increase the area or power consumption of the multiplier logic 112.

In the decimal example given above whereby a value for 945*496*945 is to be computed, the steps S204 to S210 can be summarized as shown below. In a first multiply operation (step S204) the multiplier logic 112 determines 945*496 as:

```
    945
    496
   ────
   5670
   8505
   3780
  ──────
  468720
```

Therefore the first intermediate result $w_1$ is 468720. The digits of this intermediate result are separated (step S206) to form a first portion, $w_{1,1}$=468, and a second portion, $w_{1,2}$=720. The first portion $w_{1,1}$ is saved in the memory 114 for use in the third multiply operation. In the second multiply operation (step S208), the second portion $w_{1,2}$ (720) is multiplied with the third value (945) as:

```
    945
    720
   ────
   0000
   1890
   6615
   ─────
 680400
```

Therefore the second intermediate result $w_2$ is 680400. In this example, $w_{2,1}=680$ and $w_{2,2}=400$. The first three digits (i.e. $w_{2,1}=680$) of the second intermediate result $w_2$ can be added into the third multiply operation. In the third multiply operation (step S210), the first portion $w_{1,1}$ (468) of the first intermediate result $w_1$ is multiplied with the third value (945) and the first three digits (680) of the second intermediate result $w_2$ are added to determine the third result, $w_3$ (which may be used to represent the result of the multiplication of the three values), according to the sum below:

```
    945
    468
   ────
   7560
   5670
   3780
    680
   ─────
 442940
```

It can be seen that this value for $w_3$ gives an exact result when it is concatenated with $w_{2,2}$, i.e. $\{w_3, w_{2,2}\}=442940400$ is an exact result of the multiplication computation (e.g. compare this answer with the full result given by using a 6-digit input to the second multiply stage as given by the sums above).

It is noted that the exact result, $\{w_3, w_{2,2}\}$, has 3k bits, whereas $w_3$ has 2k bits. In the example given above, k=3, and the exact result is 442940400 and $w_3$=442940. In the example of performing a check procedure for a reciprocal square root operation, the result of the multiplication computation is compared with a value of 1, which can be represented with 3k bits as a 1 bit followed by (3k−1) zeroes. To determine whether the result of the multiplication computation is greater than or less than 1, it is sufficient to consider the most significant bit of the exact result $\{w_3, w_{2,2}\}$, which is also the most significant bit of $w_3$. In this case, it is therefore not necessary to perform the concatenation of $w_3$ with $w_{2,2}$ to determine the exact result, and instead $w_3$ can be used to represent the result of the multiplication computation. However, in other examples, the result of the multiplication computation may be compared with predetermined values other than 1, e.g. with a value which has N bits. If N>2k then the concatenation of $w_3$ with $w_{2,2}$ may be performed so that the result of multiplication computation is known to sufficient accuracy in order to perform the comparison with the predetermined value.

The result of the multiplication computation (either $w_3$ or $\{w_3, w_{2,2}\}$) which represents the value of $(r+c)^2 b$ is passed to the compare logic 116. In step S212 the compare logic 116 compares the value of $(r+c)^2 b$ with 1 in order to determine the sign of g in accordance with equation 4 given above. That is, step S212 comprises determining whether the determined result of the multiplication computation is greater than, less than or equal to the value of 1.

It is noted that 1 is a terminating number such that it has a finite number of digits. Therefore, it may be the case that not all of the digits of the determined result of the multiplication computation are needed in order to determine whether the determined result is greater than, less than or equal to 1. For example, step S212 may comprise comparing the most significant digits, but not all of the digits, of the result of the multiplication computation (representing $(r+c)^2 b$) with the value of 1. Since $r^2$ is an approximation of $1/b$, the computation of $(r+c)^2 b$ is very close to 1 since c is very small compared to r.

In the examples described above, the result of the multiplication computation, i.e. either $w_3$ or $\{w_3, w_{2,2}\}$, (e.g. which represents the value of $(r+c)^2 b$) is determined and then passed to the compare logic 116 to be compared with the predetermined value (e.g. 1). However, in other examples, the third multiply operation (performed in step S210) may include subtracting the predetermined value. For example, if the predetermined value is P then a value of −P may be added in the third multiply operation, in the same way that $w_{2,1}$ is added in the third multiply operation. If the predetermined value has no more than 2k bits then this subtraction is simple to perform in the third multiply operation. Therefore, in this example, the result of the third multiply operation, $w_3$, may be given by $w_3 = w_{1,1}(r+c) + w_{2,1} - P$. In this example, the result of the third multiply operation $w_3$ (which may, or may not, be concatenated with the $w_{2,2}$ bits) is passed to the compare logic 116, and the compare logic 116 compares the result of the third multiply operation with zero. That is, it is determined whether the result of the third multiply operation is greater than, less than or equal to zero. A comparison with zero is simple to implement in hardware, and the subtraction of the predetermined value in the third multiply operation may also be simple to implement in hardware.

The value of the check parameter, g, or at least an indication of the sign of the check parameter, g, is outputted from the check module 104 and provided to the determining logic 108. If the determining logic 108 has received an indication from the decision logic 106 that a check is to be performed on the rounded value r, then in step S214 the determining logic 108 outputs either the rounded value r or an increment in the ulp of the rounded value (i.e. r+u) based on the sign of the check parameter, g. For example, if the check parameter, g, is positive then the determining logic 108 outputs the value r to represent the value of $$\frac{1}{\sqrt{b}},$$

whereas if the check parameter, g, is negative then the determining logic 108 outputs the value (r+u) to represent the value of $$\frac{1}{\sqrt{b}}.$$

The examples described above provide a way to implement a check procedure for checking the result of a reciprocal square root operation performed with the converging approximation logic 102. Conventionally, such a check is not performed because it would either not be accurate enough or the multiplier logic would need to be increased in size and power consumption to unacceptable levels. However, the check procedure can be carried out as described above with sufficient accuracy for use in the reciprocal square root check without significantly increasing the size and power consumption of the multiplier logic. A slight increase in latency (compared to performing just two multiply operations) is encountered when using the methods described herein due to the use of three multiply operations. However, it is noted that the check procedure for the result of the reciprocal square root operation is not performed very often because usually the decision logic 106 determines that the check procedure is not to be performed. As described above, it is determined that the check procedure is to be performed on average once in $2^x$ reciprocal square root calculations wherein x is the number of extra bits for which the converging approximation logic 102 computes the unrounded result r' compared to the number of bits in the rounded result r. Therefore, the extra latency of an extra multiply operation when a check procedure is performed is not a significant penalty to pay for ensuring that the rounded result of the reciprocal square root operation is always correct by implementing the check procedure as described above.

In other examples, a comparison computation may be performed for purposes other than a check procedure for the result of a reciprocal square root operation, for comparing a result of a multiplication computation with a predetermined value, wherein the multiplication computation includes determining a result of a multiplication of three values. The methods described above provide a way of performing such a comparison computation exactly without significantly increasing the size and power consumption of the multiplier logic. In the examples given above, the predetermined value with which the result of the multiplication computation is compared is a value of 1. In general, the predetermined value may be a value with N digits. In this case, the exact result of the multiplication computation $\{w_3, w_{2,2}\}$ can be compared with the predetermined value in order to determine whether the result of the multiplication computation is greater than, less than or equal to the predetermined value. The predetermined value may be a binary value (and also the three values which are multiplied by the multiplier logic 112 may be binary values, and the multiplier logic 112 may be a binary multiplier), in which case the predetermined value may be a value in base 2. For example, the predetermined value could be a power of two or a sum of two or more powers of two. To give just some examples, the predetermined value may be 2 (which can be represented exactly in binary as 10) or 3 (which can be represented exactly in binary as 11) or 0.625 (which can be represented exactly in binary as 0.101).

Figure 3:
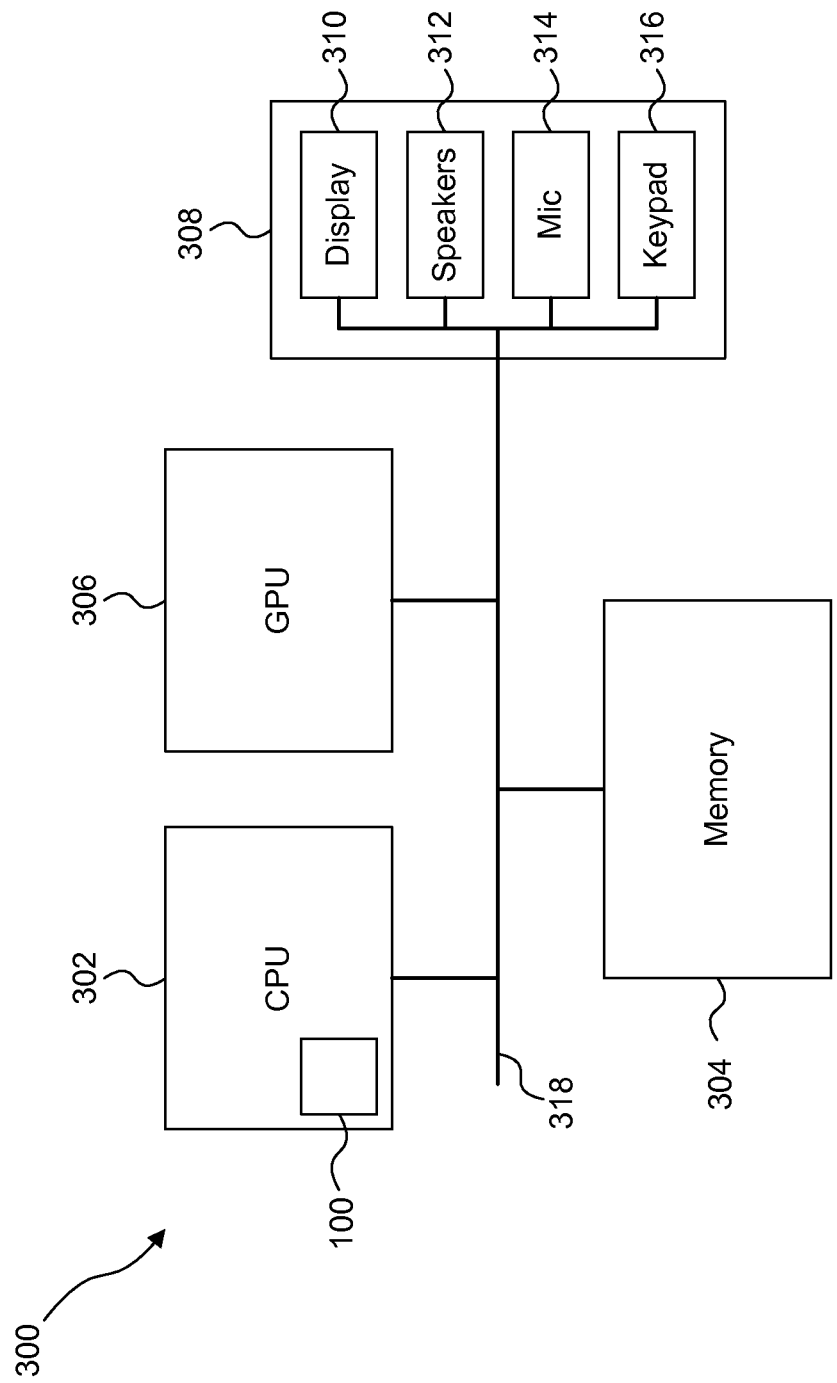
FIG. 3 shows a high-level representation of a computer system.

The computing system 100 described above with reference to FIG. 1 can be implemented as a unit at a processor in a larger computer system. For example, FIG. 3 shows a larger computer system 300 which comprises a processor 302 on which the system 100 is implemented. The processor 302 is a central processing unit (CPU). In the example shown in FIG. 3, the computer system 300 also comprises a memory 304, a graphics processing unit (GPU) 306 and other devices 308, such as a display 310, speakers 312, a microphone 314 and a keypad 316. The components of the computer system 300 can communicate with each other via a communications bus 318. In other examples, the system 100 may be implemented as a unit on the GPU 306 as well as, or instead of, being implemented as a unit on the CPU 302. When a reciprocal square root operation is to be performed, an input value b can be provided to the unit 100 and the unit 100 operates as described above to output a value of $$\frac{1}{\sqrt{b}},$$

which is known to be correctly rounded due to the check procedure, and which can then be used in the system 300 as appropriate.

The terms 'module', 'block' and 'logic' are used herein to generally represent hardware, including fixed function hardware, configurable hardware, programmable hardware, and combinations thereof. Firmware, software, or some combination thereof can be used to configure and/or program such hardware.

In one example, the methods described may be performed by a computer configured with software in machine readable form stored on a computer-readable medium. The computer-readable medium may be configured as a non-transitory computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The software may be in the form of a computer program comprising computer program code for configuring a computer to perform the constituent portions of described methods. The program code can be stored in one or more computer readable media. The features of the techniques described herein are platform-independent, meaning that the techniques may be implemented on a variety of computing platforms having a variety of processors.

Those skilled in the art will realize that all, or a portion of the functionality, techniques, logic or methods may be carried out by a dedicated circuit, an application-specific integrated circuit, a programmable logic array, a field-programmable gate array, or the like. For example, the module, block, unit or logic may comprise hardware in the form of circuitry. Such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnects, by way of example. Such elements may be provided as custom circuits or standard cell libraries, macros, or at other levels of abstraction. Such elements may be interconnected in a specific arrangement. The module, block, unit or logic (e.g. the components shown in FIG. 1) may include circuitry that is fixed function and circuitry that can be programmed to perform a function or functions; such programming may be provided from a firmware or software update or control mechanism. In an example, hardware logic has circuitry that implements a fixed function operation, state machine or process.

It is also intended to encompass software which "describes" or defines the configuration of hardware that implements a module, block, unit or logic described above, such as HDL (hardware description language) software, as is used for designing integrated circuits, or for configuring programmable chips, to carry out desired functions. That is, there may be provided a computer readable storage medium having encoded thereon computer readable program code for generating a computer system (e.g. computer hardware) configured to perform any of the methods described herein, or for generating a computer system (e.g. computer hardware) comprising any apparatus described herein. One such configuration of a computer-readable medium is signal bearing medium and thus is configured to transmit the instructions (e.g. as a carrier wave) to the computing device, such as via a network. The computer-readable medium may also be configured as a non-transitory computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The term 'processor' and 'computer' are used herein to refer to any device, or portion thereof, with processing capability such that it can execute instructions, or a dedicated circuit capable of carrying out all or a portion of the functionality or methods, or any combination thereof.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It will be understood that the benefits and advantages described above may relate to one example or may relate to several examples.

Any range or value given herein may be extended or altered without losing the effect sought, as will be apparent to the skilled person. The steps of the methods described herein may be carried out in any suitable order, or simultaneously where appropriate. Aspects of any of the examples described above may be combined with aspects of any of the other examples described to form further examples without losing the effect sought.

The invention claimed is:

1. A method of performing a comparison computation in a computer system for comparing a result of a multiplication computation with a predetermined value, wherein the comparison computation is performed in a check procedure implemented by the computer system for checking a proposed result of a reciprocal square root calculation, wherein the multiplication computation is implemented by multiplier logic of the computer system and includes a multiplication of three values, each of the three values being allowed to have a number of digits up to a maximum of k digits, wherein the multiplier logic is configured for performing multiply operations in which two input values are multiplied together to provide an output value, wherein the size of the multiplier logic is fixed such that (i) each of the two input values can have up to a maximum of k digits, and (ii) the output value can have up to a maximum of 2k digits, the method comprising:

performing a reciprocal square root calculation with converging approximation logic on an input value b to generate the proposed result $$r = \frac{1}{\sqrt{b}},$$

performing a first multiply operation with the multiplier logic of the computer system to determine a first intermediate result by multiplying a first and a second of the three values;

separating digits of the first intermediate result to form: (i) a first portion comprising the most significant digits of the first intermediate result, and (ii) a second portion comprising less significant digits of the first intermediate result, wherein each of the first and second portions of the first intermediate result have ≤k digits;

per a second multiply operation with the multiplier logic to determine a second intermediate result by multiplying a third of the three values with said second portion of the first intermediate result;

performing a third multiply operation with the multiplier logic to determine a third result, the third multiply operation including multiplying the third of the three values with said first portion of the first intermediate result and adding at least one of the digits of the second intermediate result; and performing the check procedure for checking the proposed result of the reciprocal square root calculation by using the third result to determine a comparison of the result of the multiplication computation with the predetermined value, wherein the three values include b and (r+c), c has a value of 0, $$\frac{u}{2}$$

or u, and u is an increment in the least significant digit position of r.

2. A computer system configured to perform a comparison computation for comparing a result of a multiplication computation with a predetermined value, wherein the multiplication computation includes a multiplication of three values, each of the three values being allowed to have up to a maximum of k digits, the computer system comprising a converging approximation look, to generate a proposed result $$r = \frac{1}{\sqrt{b}}$$

for a reciprocal square root computation, and a check module configured to receive b and r as input values and to perform a check procedure for checking the proposed result of the reciprocal square root calculation, the check module comprising:

multiplier logic configured to perform multiply operations in which two input values are multiplied together to provide an output value, wherein the size of the multiplier logic is fixed such that (i) each of the two input values can have up to a maximum of k digits, and (ii) the output value can have up to a maximum of 2k digits; and a controller configured to control the multiplier logic so as to cause the multiplier logic to implement multiply operations for the multiplication computation by:

performing a first multiply operation with the multiplier logic to determine a first intermediate result by multiplying a first and a second of the three values, wherein the digits of the first intermediate result are separable to form: (i) a first portion comprising the most significant digits of the first intermediate result, and (ii) a second portion comprising less significant digits of the first intermediate result, wherein each of the first and second portions of the first intermediate result have ≤k digits;

performing a second multiply operation with the multiplier logic to determine a second intermediate result by multiplying a third of the three values with said second portion of the first intermediate result; and performing a third multiply operation with the multiplier logic to determine a third result, the third multiply operation including multiplying the third of the three values with said first portion of the first intermediate result and adding at least one of the digits of the second intermediate result;

wherein the check module further comprises compare logic configured to perform the check procedure for checking the result of the reciprocal square root calculation by using the third result to determine a comparison of the result of the multiplication computation with the predetermined value, and wherein the three values include b and (r+c), c has a value of 0, $$\frac{u}{2}$$

or u, and u is an increment in the least significant digit position of r.

3. The computer system of claim 2 wherein the compare logic is configured to use the third result to determine a comparison of the result of the multiplication computation with the predetermined value by determining whether the result of the multiplication computation is greater than, less than or equal to the predetermined value.

4. The computer system of claim 2 wherein the computer system is configured to determine the result of the multiplication computation to be either: (i) the third result, or (ii) a concatenation of the third result with digits of the second intermediate result which are not added in the third multiply operation.

5. The computer system of claim 2 wherein the third multiply operation further includes subtracting the predetermined value, and wherein the compare logic is configured to use the third result to determine a comparison of the result of the multiplication computation with the predetermined value by comparing the third result with zero.

6. The computer system of claim 2 wherein the compare logic is configured to compare the most significant digits, but not all of the digits, of the third result with the predetermined value.

7. The computer system of claim 2 wherein the predetermined value has N digits, wherein N is less than or equal to the number of digits of the third result, and wherein the compare logic is configured to compare at least N of the most significant digits of the third result with the predetermined value.

8. The computer system of claim 2 further comprising a memory configured to store values including at least the first portion of the first intermediate result and the third of the three values, wherein the controller is configured to control the memory such that appropriate values are provided as inputs to the multiplier logic for the multiply operations.

9. The computer system of claim 2 wherein the multiplier logic is configured such that the third multiply operation comprises adding at least some of the digits of the second intermediate result.

10. The computer system of claim 2 wherein the multiplier logic is configured such that the third multiply operation comprises adding the k most significant digits of the second intermediate result.

11. The computer system of claim 2 wherein the first portion of the first intermediate result comprises the k most significant digits of the first intermediate result, and the second portion of the first intermediate result comprises the remaining digits of the first intermediate result.

12. The computer system of claim 2 wherein the first portion of the first intermediate result comprises the most significant half of the digits of the first intermediate result, and the second portion of the first intermediate result comprises the least significant half of the digits of the first intermediate result.

13. The computer system of claim 2 wherein the multiplier logic is a binary multiplier, and wherein the three values and the predetermined value are binary values.

14. The computer system of claim 2 wherein the check module is configured to use the comparison computation to determine a check parameter, g, in accordance with the equation $g=(r+c)^2 b-1$, where c has a value of 0, $$\frac{u}{2}$$

or u depending on a rounding mode, wherein the three values of which the multiplier logic is configured to determine a multiplication are (r+r), (r+c) and b, and wherein the predetermined value is 1.

15. The computer system of claim 14 further comprising determining logic which is arranged to receive an indication of the sign of the check parameter, g, and is configured to output the value of r as a value representing $$\frac{1}{\sqrt{b}}$$

if g is positive, and to output the value of (r+u) as a value representing $$\frac{1}{\sqrt{b}}$$

if g is negative.

16. A computer readable storage medium having encoded thereon: (i) computer readable code for generating a computer system according to claim 2, or (ii) computer readable code adapted to perform the steps of the method of claim 1 when the code is run on a computer.

17. A computer system configured to perform a multiplication computation which includes determining a result of a multiplication of three values, each of the three values having up to a maximum of k digits, the computer system comprising a converging approximation logic to generate a proposed result $$r = \frac{1}{\sqrt{b}}$$

for a reciprocal square root computation, and a check module configured to receive b and r as input values and to perform a check procedure, wherein the multiplication computation is in the check procedure implemented by the check module for checking the result of the reciprocal square root calculation, the check module comprising:

multiplier logic comprising two inputs and an output, wherein the multiplier logic is configured to perform multiply operations in which b and (r+c) are received at the respective two inputs and multiplied together to provide an output value at the output, where c has a value of 0, $$\frac{u}{2}$$

or u and u, is an increment in the least significant digit position of r, and wherein the size of the multiplier logic is fixed such that (i) each of the two inputs can receive input values having up to a maximum of k digits, and (ii) the output can provide outputs having up to a maximum of 2k digits; and a controller configured to control the multiplier logic so as to cause the multiplier logic to implement the multiplication computation by:

performing a first multiply operation with the multiplier logic to determine a first intermediate result by multiplying a first and a second of the three values, wherein the digits of the first intermediate result are separable to form: (i) a first portion comprising the most significant digits of the first intermediate result, and (ii) a second portion comprising less significant digits of the first intermediate result, wherein each of the first and second portions of the first intermediate result have k digits;

performing a second multiply operation with the multiplier logic to determine a second intermediate result by multiplying a third of the three values with said second portion of the first intermediate result; and performing a third multiply operation with the multiplier logic to determine a third result by multiplying the third of the three values with said first portion of the first intermediate result and adding at least one of the digits of the second intermediate result, wherein the third result is indicative, of the result of the multiplication computation.

18. A method of performing a multiplication computation in a computer system, wherein the multiplication computation is performed in a check procedure implemented by the computer system for checking the proposed result of a reciprocal square root calculation, wherein the multiplication computation is implemented by multiplier logic of the computer system and includes determining result of a multiplication of three values, each of the three values having up to a maximum of k digits, wherein the multiplier logic is configured for performing multiply operations in which two input values are multiplied together to provide an output value, wherein the size of the multiplier logic is fixed such that (i) each of the two input values can have up to a maximum of k digits, and (ii) the output value can have up to a maximum of 2k digits, the method comprising:

performing a reciprocal square root calculation with converging approximation logic on an input value b to generate the proposed result $$r = \frac{1}{\sqrt{b}},$$

performing a first multiply operation with the multiplier logic of the computer system to determine a first intermediate result by multiplying a first and a second of the three values;

separating digits of the first intermediate result to form: (i) a first portion comprising the most significant digits of the first intermediate result, and (ii) a second portion comprising less significant digits of the first, intermediate result, wherein each of the first and second portions of the first intermediate result have ≤k digits;

performing a second multiply operation with the multiplier logic to determine a second intermediate result by multiplying a third of the three values with said second portion of the first intermediate result; and performing a third multiply operation with the multiplier logic to determine a third result by multiplying the third of the three values with said first portion of the first intermediate result and adding at least one of the digits of the second intermediate result, wherein the third result is indicative of the result of the multiplication computation, wherein the three values include h and (r+c), c has a value of 0, $$\frac{u}{2}$$

or u, and u is an increment in the least significant digit position of r.

* * * * *